(12) United States Patent
Lu et al.

(10) Patent No.: US 12,014,475 B2
(45) Date of Patent: Jun. 18, 2024

(54) UNSUPERVISED IMAGE-TO-IMAGE TRANSLATION METHOD BASED ON STYLE-CONTENT SEPARATION

(71) Applicant: Beihang University, Beijing (CN)

(72) Inventors: Feng Lu, Beijing (CN); Yunfei Liu, Beijing (CN)

(73) Assignee: Beihang University, Beijing (CN)

(*) Notice: Subject to any disclaimer, the term of this patent is extended or adjusted under 35 U.S.C. 154(b) by 310 days.

(21) Appl. No.: 17/565,252

(22) Filed: Dec. 29, 2021

(65) Prior Publication Data

US 2022/0207649 A1 Jun. 30, 2022

(30) Foreign Application Priority Data

Dec. 31, 2020 (CN) .................... 202011640875.X

(51) Int. Cl.
| | |
|---|---|
| *G06T 3/4046* | (2024.01) |
| *G06T 5/20* | (2006.01) |
| *G06T 5/70* | (2024.01) |
| *G06V 10/20* | (2022.01) |
| *G06V 10/764* | (2022.01) |
| *G06V 10/77* | (2022.01) |
| *G06V 10/80* | (2022.01) |
| *G06V 20/64* | (2022.01) |

(52) U.S. Cl.
CPC .............. *G06T 3/4046* (2013.01); *G06T 5/20* (2013.01); *G06T 5/70* (2024.01); *G06V 10/255* (2022.01); *G06V 10/764* (2022.01); *G06V 10/7715* (2022.01); *G06V 10/806* (2022.01); *G06V 20/64* (2022.01)

(58) Field of Classification Search
CPC ......... G06T 3/4046; G06T 5/002; G06T 5/20; G06T 5/70; G06V 10/255; G06V 10/764; G06V 10/7715; G06V 10/806; G06V 20/64

See application file for complete search history.

(56) References Cited

U.S. PATENT DOCUMENTS

| | | | |
|---|---|---|---|
| 2019/0244329 A1* | 8/2019 | Li | ........................... G06N 3/088 |
| 2021/0142454 A1* | 5/2021 | Kubendran | .............. G06N 3/04 |

* cited by examiner

*Primary Examiner* — Casey L Kretzer

(57) ABSTRACT

The embodiments of this disclosure disclose an unsupervised image-to-image translation method. A specific implementation of this method comprises: obtaining an initial image, and zooming the initial image to a specific size; performing spatial feature extraction on the initial image to obtain feature information; inputting the feature information to a style-content separation module to obtain content feature information and style feature information; generating reference style feature information of a reference image in response to obtaining the reference image, and setting the reference style feature information as a Gaussian noise in response to not obtaining the reference image; inputting the content feature information and the reference style feature information into a generator to obtain a target image; and zooming the target image to obtain a final target image. This implementation can be applied to a variety of different high-level visual tasks, and improve the expandability of the whole system.

6 Claims, 4 Drawing Sheets

UNSUPERVISED IMAGE-TO-IMAGE TRANSLATION METHOD BASED ON STYLE-CONTENT SEPARATION

CROSS-REFERENCE TO RELATED APPLICATIONS

The present application is based on, and claims priority from, Chinese application number CN202011640875.X, filed Dec. 31, 2020, the disclosure of which is hereby incorporated by reference herein in its entirety.

TECHNICAL FIELD

The embodiments of this disclosure relate to the technical field of computer vision and image processing, and in particular, to an unsupervised image-to-image translation method.

BACKGROUND OF THE INVENTION

Image-to-image translation has received extensive attention thanks to its ability to learn the mapping between different visual domains. In many of the existing social media or chat software, the chat partners are converted into cute animals, and the converted animal expressions are consistent with the original partners during the chat process. Alternatively, the style of the chat background is changed while the spatial structure information of the background is maintained. Alternatively, it needs to swap the virtual scene with the real scene in a scene of the augmented reality application where the virtual is combined with the real, and etc. All these are typical image-to-image applications. Pix2pix (pixels to pixels conversion tool) is the first to use a conditional generative adversarial network for image-to-image translation. And on this basis, a series of explorations apply image-to-image conversion technology to process other computer visual tasks. For example, there are image super-resolution, image coloring, style transfer and other low-level image tasks.

In order to lessen the shortage of paired training data in practical applications, Zhu et al. use consistency constraints and propose cycle generative adversarial networks (Cycle-GAN for short), wherein an additional generator is introduced to map the image of the target domain to the image of the source domain, thereby completing the unsupervised image-to-image translation task. By setting up the image of the source domain and the image of the target domain to share a common content space, Liu et al. propose an unsupervised image-to-image translation method based on an adversarial generative network and a variational self-encoder in UNIT (UNsupervised Image-to-image Translation networks). Based on these two methods, many works apply the attention mechanism to this task.

Some works extend the task of image-to-image translation from one-to-one to one-to-many. By assuming that an image can be decomposed into domain-independent content coding and domain-dependent style coding, CIIT (Conditional Iage-to-Image Translation), EG-UNIT (Exemplar Guided Unsupervised Image-to-image Translation with semantic consistency), MUNIT (Multimodal UNsupervised Image-to-image Translation networks) and DRIT (DiveRse Image-to-image Translation via disentangled representations) and other methods learn one-to-many mapping between two image domains. Other methods add additional constraints to the image translation process to improve the effect of decoupling the style and content in the image. However, the above methods use two independent encoders to separately extract the content feature information and style feature information of the image, instead of using a unified framework. Therefore, the disadvantages of this type of methods are that: 1) They cannot guarantee that the features of the content are effectively focused on meaningful objects in the image; 2) Style features often focus on the appearance of the entire image, but cannot effectively extract different styles of different objects.

Regarding the above two disadvantages, some studies have introduced high-level visual tasks as additional constraints. For example, Wu et al. propose to use object key point detection to constrain the content feature of the image. Shen et al. add the detection technology of objects in the image to the image-to-image translation method to separately extract the content information and style information of different objects in an image. Roy et al. add the semantic analysis of the image scene to the method to guarantee that the content feature learns the features related to the image semantics. The disadvantage of this type of methods is that different network architectures need to be designed for specific high-level visual tasks. If no corresponding advanced visual information can be provided on the new data, the same method can hardly extend to multiple image-to-image translation tasks.

SUMMARY OF THE INVENTION

The content of this disclosure is to introduce concepts in a brief form, and these concepts will be described in detail in the following section of the detailed description of the invention. The content of this disclosure is not intended to identify the key features or essential features of the claimed technical solution, nor is it intended to limit the scope of the claimed technical solution.

Some embodiments of this disclosure propose an unsupervised image-to-image translation method to solve one or more of the technical problems mentioned in the background section above.

According to the above-mentioned actual needs and technical difficulties, the purpose of this invention is: to propose a unified framework to effect image-to-image translation methods in different scenarios, to separate content feature information and style feature information of the image by measuring the correlation of the feature information and the high-level visual tasks in the feature space, and to generate a target image after translation by combining the content feature information of the initial image with the reference style feature information of the reference image. The training data of this method does not require paired data, but uses only two sets of image of different categories to complete the training. At the same time, this method proposes a feature fusion method to effectively reduce the influence of the water drop phenomenon on the generated image, and obtain better image generation quality.

The above various embodiments of this disclosure have the following beneficial effects: inventing a unified architecture to extract the content feature information and style feature information of an image, which can be applied to a variety of different high-level visual tasks, be very flexible, and improve the overall system's extendibility; inventing a novel separation module of the image content feature and style feature; by calculation, measuring the correlation of the extracted image space feature and the high-level visual task in the feature space, wherein the part which has a correlation degree greater than or equal to a predetermined threshold is extracted as the content feature information, and the part which has a correlation degree below the predetermined threshold is extracted as the style feature information. This is helpful to ensure that the content feature information is stably focused on the effective objects in the image. At the same time, the style feature information is made include different objects in the image. By using a normalized feature fusion method in the generator, the range of modification to the existing method is small, so can be easily and quickly extended to other methods. The influence of the water drop phenomenon on the generated images can be effectively reduced, thus enabling the method to generate results more steadily, and obtaining better quality target images.

DESCRIPTION OF THE DRAWINGS

The above and other features, advantages, and aspects of the embodiments of this disclosure will become more apparent in conjunction with the accompanying drawings and with reference to the following detailed description. Throughout the drawings, the same or similar reference signs indicate the same or similar elements. It should be understood that the drawings are schematic, and the components and elements are not necessarily drawn to scale.

DETAILED DESCRIPTION OF THE INVENTION

Figure 1:
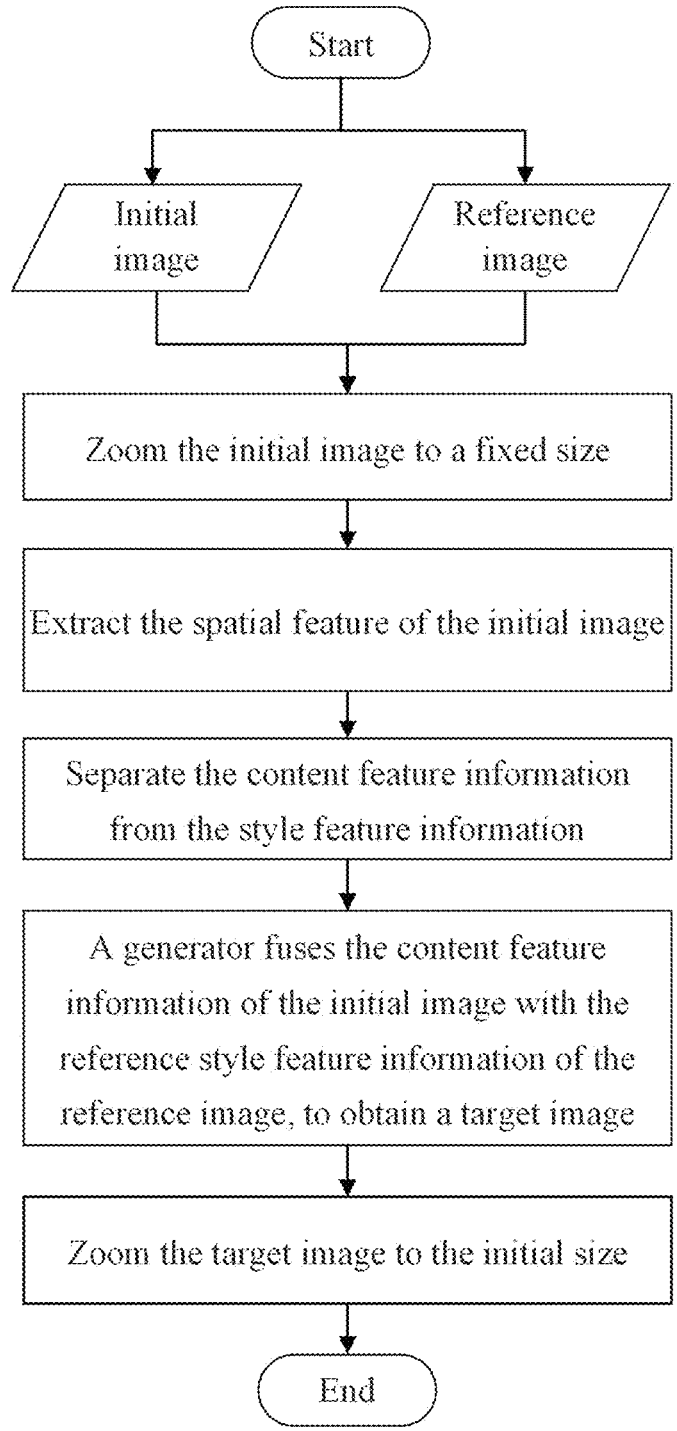
FIG. 1 is a flowchart of some embodiments of an unsupervised image-to-image translation method according to some embodiments of this disclosure.

Hereinafter, the embodiments of this disclosure will be described in more detail with reference to the accompanying drawings. Although certain embodiments of this disclosure are shown in the drawings, it should be understood that this disclosure can be implemented in various forms, and shall not be construed as being limited to the embodiments set forth herein. On the contrary, these embodiments are provided for a more thorough and complete understanding of this disclosure. It should be understood that the drawings and embodiments of this disclosure are used only for illustrative purposes, not to limit the protection scope of this disclosure.

Besides, it should be noted that, for ease of description, only the parts related to the relevant invention are shown in the drawings. In the case of no confliction, the embodiments in this disclosure and the features in the embodiments can be combined with each other.

It should be noted that such adjuncts as "one" and "more" mentioned in this disclosure are illustrative, not restrictive, and those skilled in the art should understand that unless the context clearly indicates otherwise, they should be understood as "one or more".

The following is a detailed description of this disclosure with reference to the drawings and in conjunction with embodiments.

FIG. 1 is a flowchart of some embodiments of an unsupervised image-to-image translation method according to some embodiments of this disclosure.

Figure 3:
FIG. 3 is a schematic diagram of one application scenario of an unsupervised image-to-image translation method according to some embodiments of this disclosure.
Figure 6:
FIG. 6 is a schematic diagram of another application scenario of an unsupervised image-to-image translation method according to some embodiments of this disclosure.
Figure 7:
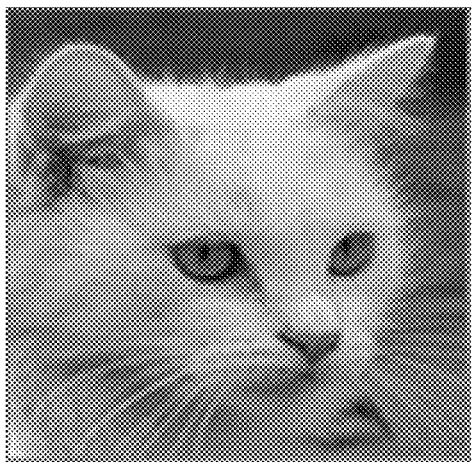
FIG. 7 is a schematic diagram of still another application scenario of an unsupervised image-to-image translation method according to some embodiments of this disclosure.

Referring to FIG. 1, the basic operation of this invention's unsupervised image-to-image translation method based on style-content separation is to input an initial image. As shown in FIG. 3, taking the conversion of a portrait into a cat in a video chat as an example, if a picture of specified style is required, a reference image needs to be entered (a cat of specified color and breed), as shown in FIG. 6, and a target image consistent with the style of the reference image is output, as shown in FIG. 7.

Figure 2:
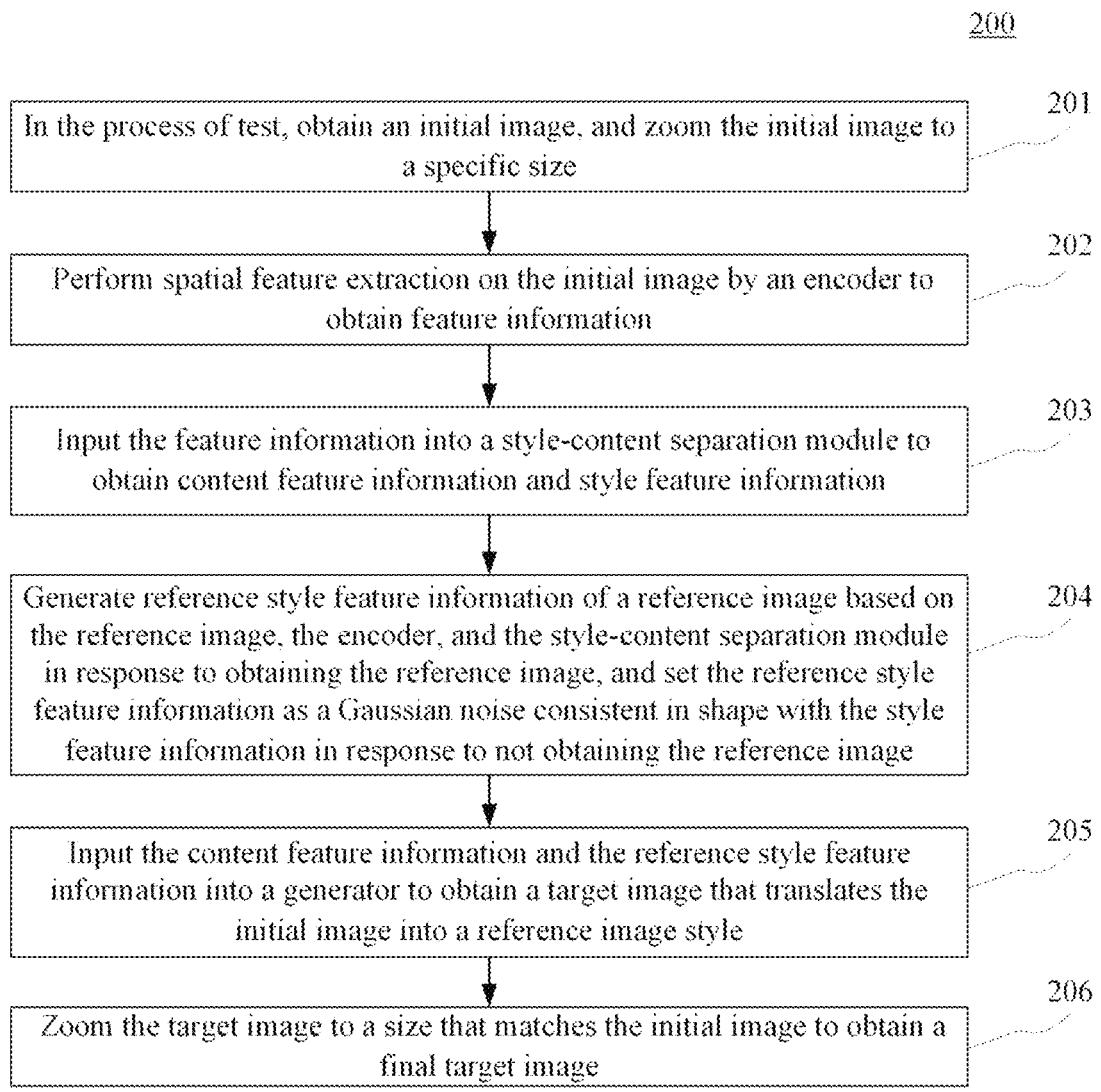
FIG. 2 is a flowchart of some embodiments of an unsupervised image-to-image translation method according to this disclosure.

Proceeding to see FIG. 2, there is shown a process 200 of some embodiments of the unsupervised image-to-image translation method according to this disclosure. The unsupervised image-to-image translation method includes the following steps:

Step 201: In the process of test, obtain an initial image, and zoom the initial image to a specific size.

In some embodiments, the executive body of the unsupervised image-to-image translation method may obtain an initial image and zoom the initial image to a specific size, wherein the initial image may be an image from a predetermined category.

As an example, the image of a predetermined category may be an image having the same object (cat, man, etc.) in the foreground, or an image whose contents are all of the same painting style (summer, simulated scene, and so on).

Step 202: Perform spatial feature extraction on the initial image by an encoder to obtain feature information.

In some embodiments, the executive body may perform spatial feature extraction on the initial image by an encoder to obtain feature information, wherein the manifestation of the feature information is a four-dimensional tensor, wherein the encoder is an encoder used to separate the content feature information from the style feature information, wherein the spatial feature information of the initial image extracted by the encoder is used for high-level visual tasks.

Figure 5:
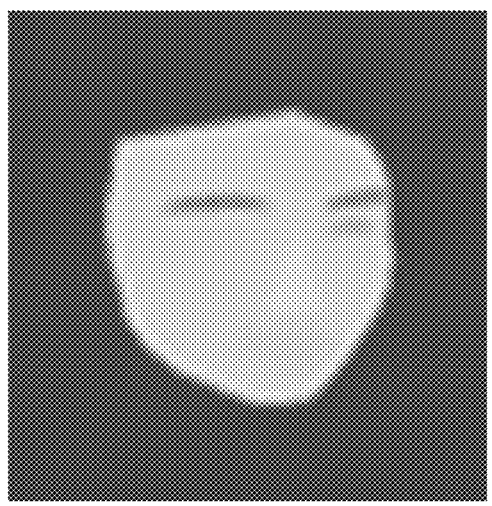
FIG. 5 is a schematic diagram of still another application scenario of an unsupervised image-to-image translation method according to some embodiments of this disclosure.

As an example, the high-level visual tasks can be image classification, target key point detection, or image semantic segmentation etc. The information of different dimensions in the four-dimensional tensor respectively represents: batch, channel, height and width. The four-dimensional tensor can further complete the high-level visual task corresponding to the initial image, as shown in FIG. 5.

First of all, for the input image, this encoder of unified structure can complete the separation of the image content feature information and style feature information, and at the same time complete the corresponding high-level visual tasks. The calculation method of the encoder is as follows:

$$c, s, H = E(F(x)).$$

Wherein, c represents the content feature information. s represents the style feature information. H represents the high-level visual tasks. E represents the feature separation module. F( ) represents the feature extractor. F(x) represents the feature information obtained by the feature extractor extracting the initial image. x represents the initial image.

Figure 4:
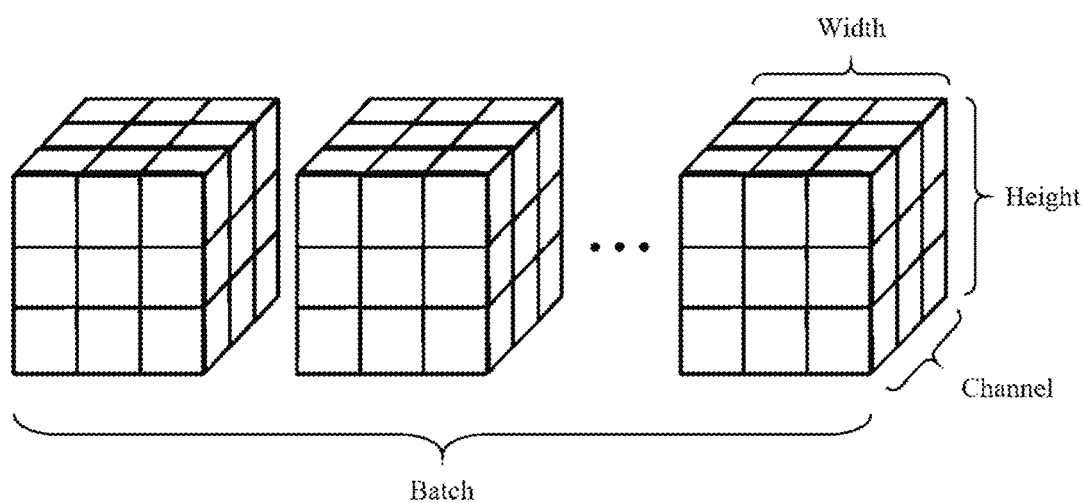
FIG. 4 is a schematic diagram of another application scenario of an unsupervised image-to-image translation method according to some embodiments of this disclosure.

The significance of this encoder is that, firstly, the feature extraction of the high-level visual tasks can be performed with only one feature extractor, the extracted feature information is shown in FIG. 4. This feature information can be applied to a variety of different high-level visual tasks, be very flexible, and improve the extendibility of the entire system on different data. Secondly, the classification of the content feature information and style feature information and the high-level visual tasks can be adaptively optimized through multi-task learning for content feature learning and style feature learning. Make sure that the content features are effectively focused on the objects related to high-level vision in the image, improving the accuracy of the target image. The style feature information will also include more styles of different objects in the image, instead of being limited to the overall style of the picture, thereby enhancing the richness of the target image.

Step 203: Input the feature information into a style-content separation module to obtain content feature information and style feature information.

In some embodiments, the executive body may input the feature information into the style-content separation module to obtain the content feature information and the style feature information, wherein the manifestation of the content feature information is a four-dimensional tensor, the manifestation of the style feature information is a two-dimensional tensor. The style-content separation module is used to separate the content feature information from the style feature information. The style-content separation module is a module with selection, compression and extraction functions.

As an example, the extracted features are inputted into a module with selection, compression and extraction functions, for separation of content from style. The correlation of the features and high-level visual tasks are calculated in the channel dimension, wherein the part which has a correlation greater than or equal to a predetermined threshold is separated to obtain the content feature information, and the part which has a correlation below a predetermined threshold is separated to obtain the style feature information corresponding to the image.

In certain optional implementations of some embodiments, the style-content separation module includes a content feature extraction module and a style feature extraction module, wherein:

The content feature extraction module is used to extract the correlation between the information in the different channels in the spatial feature of the initial image and the high-level visual task, and extract the part that has a corresponding correlation degree greater than or equal to a predetermined threshold as the content feature information.

The style feature extraction module is used to extract the correlation between the information in the different channels in the spatial feature of the initial image and the high-level visual task, and extract the part that has a corresponding correlation degree below a predetermined threshold, and process it through a pooling layer as the style feature information.

As an example, a feature extractor is used to perform feature extraction of the high-level visual task on an input image. In the task of converting a human face image into a cat face image, an illustration of the high-level visual task is shown in FIG. 5. Different types of facial semantics can assist the generation of image content feature information and style feature information. To be specific, based on high-level visual features, first analyze the feature information between different channels of the extracted features through adaptive average pooling. In order to more accurately describe the correlation between the feature information of different channels and the high-level visual tasks, the feature information between the channels obtained in the previous step is non-linearly mapped through a multi-layer perceptron to obtain a list of the correlation between each channel in the feature and the high-level visual task. Each element in the list represents the correlation coefficient of the corresponding channel and the high-level visual task. Further, the list is sorted in descending order, and the features corresponding to the elements at the top of the sorted list have better correlation with the high-level tasks. Therefore, the separation calculation method of the content feature information and style feature information is as follows:

$$\begin{cases} I = \text{index\_of\_descent\_sort}(\Phi_1(\Psi(F(x)))) \\ I_c = I \times \lfloor a \times r \rfloor \\ c, s = F(x)_{I_c}, \Phi(F(x)_{I \setminus I_c}) \end{cases},$$

Wherein, I represents the index information in the separation calculation method of the content feature information and style feature information. index_of_descent_sort( ) represents the element index in descending order. $\Phi_1$ represents the multi-layer perceptron. x represents the initial image. F(x) represents the feature information obtained by the feature extractor extracting the initial image. $\Psi($ ) represents the adaptive average pooling. $I_c$ represents the index information of the content feature information. c represents the content feature information. a represents the number of channel dimensions of the feature information. r represents the extraction ratio. The value range of r is $r \in (0,1)$. c represents the content feature information. S represents the style feature information. $F(x)_{I_c}$ represents the feature information indexed by $I_c$. $\Phi_2$ represents a convolutional neural network composed of three convolutional layers and one average pooling layer. $F(x)_{I \setminus I_c}$ represents the feature information indexed by $I \setminus I_c$. $I \setminus I_c$ represents the index information after excluding $I_c$ from I.

Step 204: Generate reference style feature information of a reference image based on the reference image, the encoder, and the style-content separation module in response to obtaining the reference image; and set the reference style feature information as a Gaussian noise consistent in shape with the style feature information in response to not obtaining the reference image.

In some embodiments, the executive body may generate reference style feature information of the reference image based on the reference image, the encoder, and the style-content separation module in response to obtaining the reference image, and set the reference style feature information as a Gaussian noise consistent in shape with the style feature information in response to not obtaining the reference image.

In certain optional implementations of some embodiments, the reference image is an image of a different category from the initial picture; and in response to not obtaining the reference image, the reference style feature information is set as a Gaussian noise consistent in shape with the style feature information, which can include the following steps:

In response to not obtaining the reference image, the reference style information of the corresponding reference image is set as a tensor of a shape that matches the style feature information of the initial image, wherein each element in the tensor comes from a Gaussian noise that has a mean value of 0 and a variance of 1.

As an example, in response to not obtaining the reference image, the style feature information is set as:

$$\begin{cases} s = [m_{ij}]^{b \times c} \\ m_{i,j} \sim N(0, 1) \end{cases},$$

Wherein, s represents the style feature information. m represents the feature element. $m_{ij}$ represents the feature element in the $i^{th}$ row and $j^{th}$ column. b represents the size of the batch. c represents a hyperparameter. The value of c can be 8. N(0,1) represents a Gaussian distribution with a mean value of 0 and a variance of 1. Specifically, for application scenarios where no reference image is obtained, this invention will randomly generate a kind of style feature information, and thereby generate a random target image.

Step 205: Input the content feature information and the reference style feature information into a generator to obtain a target image that translates the initial image into a reference image style.

In some embodiments, the executive body may input the content feature information and the reference style feature information into a generator to obtain a target image that translates the initial image into a reference image style.

In certain optional implementations of some embodiments, the generator includes a feature fusion module and an image generator with a feature fusion function, wherein the feature fusion module is a module that uses style feature information to guide the generation of the content feature information, wherein:

The feature fusion module is used to perform non-linear mapping of the style feature information and perform feature fusion to obtain the style feature information after feature fusion, wherein the style feature information after feature fusion is used to adjust the mean value and variance of the content feature information, and fuse the style feature information with the content feature information.

The calculation method included in the feature fusion module is as follows:

$$\begin{cases} \sigma(z) = \dfrac{1}{1 + (1 + \exp(-z))} \\ NAIN(z, \gamma, \beta) = \sigma(\gamma) \times \left( \dfrac{z - \mu(z)}{\sigma(z)} \right) + \sigma(\beta) \end{cases},$$

wherein, $\sigma(\ )$ represents a Sigmoid normalization function, z represents a feature value corresponding to the feature information, $\sigma(z)$ represents a feature value corresponding to the feature information normalized on z, $\exp(\ )$ represents an exponential function with a natural constant as a base, $-z$ represents negative number of the feature value corresponding to the feature information, $\exp(-z)$ represents a exponential function of $-z$ with a natural constant as a base, NAIN represents a feature value corresponding to feature information obtained by feature fusion processing, $\gamma$ represents a feature value corresponding to feature scale information learned in a multi-layer perceptron, $\beta$ represents a feature value corresponding to feature offset information learned in the multi-layer perceptron, $NAIN(z,\gamma,\beta)$ represents a feature value corresponding to feature information obtained by feature fusion processing of z, $\gamma$, and $\beta$, $\sigma(\gamma)$ represents a feature value corresponding to the feature information normalized on $\gamma$, $\sigma(z)$ represents a feature value corresponding to the feature information normalized on z, $\mu(z)$ represents a mean value of z, $\sigma(\beta)$ represents a feature value corresponding to the feature information normalized on $\beta$.

The image generator with the feature fusion function is used to combine with the feature fusion module to fuse the content feature information and the style feature information, and further, through multiple convolutions and up-sampling, to generate a translated target image.

As an example, in specific implementations, the water drop phenomenon often occurs in the generated image, which affects the quality of the generated image. This invention proposes to use a normalized feature fusion method to solve the water drop phenomenon and improve the quality of the generated image. The water drop phenomenon can be well resolved by the feature fusion module, and the style feature information of the image can guide the generator well to reconstruct high-quality pictures.

Step 206: Zoom the target image to a size that matches the initial image to obtain a final target image.

In some embodiments, the executive body may zoom the target image to a size that matches the initial image to obtain the final target image.

The above description is only some preferred embodiments of this disclosure and an explanation of the applied technical principles. Those skilled in the art should understand that the scope of invention involved in the embodiments of this disclosure is not limited to the technical solutions formed by the specific combination of the above technical features, but should also cover other technical solutions formed by any combination of the above technical features or their equivalent features without departing from the above-mentioned inventive concept, for example, technical solutions formed by replacing the above features with the technical features of similar functions disclosed in (but not limited to) the embodiments of this disclosure.

The invention claimed is:

1. An unsupervised image-to-image translation method, comprising:
   in a process of test, obtaining an initial image, and zooming the initial image to a specific size;
   performing spatial feature extraction on the initial image by an encoder to obtain feature information, wherein a manifestation of the feature information is a four-dimensional tensor;
   inputting the feature information to a style-content separation module to obtain content feature information and style feature information, wherein a manifestation of the content feature information is a four-dimensional tensor, and a manifestation of the style feature information is a two-dimensional tensor;
   generating reference style feature information of a reference image based on the reference image, the encoder, and the style-content separation module in response to obtaining the reference image, and setting the reference style feature information as a Gaussian noise consistent in shape with the style feature information in response to not obtaining the reference image;
   inputting the content feature information and the reference style feature information into a generator to obtain a target image that translates the initial image into a reference image style; and
   zooming the target image to a size that matches the initial image to obtain a final target image.

2. The method of claim 1, wherein the initial image is an image from a predetermined category.

3. The method of claim 2, wherein spatial feature information of the initial image extracted by the encoder is used for a high-level visual task.

4. The method of claim 3, wherein the style-content separation module is used to separate the content feature information from the style feature information, wherein the style-content separation module is a module with selection, compression and extraction functions, and the style-content separation module includes a content feature extraction module and a style feature extraction module, wherein:
- the content feature extraction module is used to extract a correlation between the spatial feature information of the initial image in different channels and the high-level visual task, and extract a part that has a corresponding correlation degree greater than or equal to a predetermined threshold as the content feature information;
- the style feature extraction module is used to extract the correlation between the spatial feature information of the initial image in different channels and the high-level visual task, and extract a part that has a corresponding correlation degree below a predetermined threshold, and process it through a pooling layer as the style feature information.

5. The method of claim 4, wherein the reference image is an image of a different category from the initial image; and
in response to not obtaining the reference image, setting the reference style feature information as a Gaussian noise consistent in shape with the style feature information includes:
- in response to not obtaining the reference image, the reference style information of the corresponding reference image is set as a tensor of a shape that matches the style feature information of the initial image, wherein each element in the tensor comes from a Gaussian noise that has a mean value of 0 and a variance of 1.

6. The method of claim 5, wherein the generator includes a feature fusion module and an image generator with a feature fusion function, wherein the feature fusion module is a module that uses the style feature information to guide a generation of the content feature information, wherein:
- the feature fusion module is used to perform non-linear mapping of the style feature information, and perform normalization to obtain the normalized style feature information, wherein the normalized style feature information is used to adjust a mean value and a variance of the content feature information, and fuse the style feature information with the content feature information;
- the calculation method included in the feature fusion module is as follows:

$$\begin{cases} \sigma(z) = \dfrac{1}{1+(1+\exp(-z))} \\ NAIN(z, \gamma, \beta) = \sigma(\gamma) \times \left(\dfrac{z-\mu(z)}{\sigma(z)}\right) + \sigma(\beta) \end{cases},$$

wherein, $\sigma(\ )$ represents a Sigmoid normalization function, z represents a feature value corresponding to the feature information, $\sigma(z)$ represents a feature value corresponding to the feature information normalized on z, $\exp(\ )$ represents an exponential function with a natural constant as a base, $-z$ represents negative number of the feature value corresponding to the feature information, $\exp(-z)$ represents a exponential function of $-z$ with a natural constant as a base, NAIN represents a feature value corresponding to feature information obtained by feature fusion processing, $\gamma$ represents a feature value corresponding to feature scale information learned in a multi-layer perceptron, $\beta$ represents a feature value corresponding to feature offset information learned in the multi-layer perceptron, NAIN $(z, \gamma, \beta)$ represents a feature value corresponding to feature information obtained by feature fusion processing of z, $\gamma$, and $\beta$, $\sigma(\gamma)$ represents a feature value corresponding to the feature information normalized on $\gamma$, $\sigma(z)$ represents a feature value corresponding to the feature information normalized on z, $\mu(z)$ represents a mean value of z, $\sigma(\beta)$ represents a feature value corresponding to the feature information normalized on $\beta$;
- the image generator with the feature fusion function is used to combine with the feature fusion module to fuse the content feature information and the style feature information, and further, through multiple convolutions and up-sampling, to generate a translated target image.

\* \* \* \* \*